Aug. 13, 1968  W. G. BROSENE, JR  3,397,015
STUD FEEDING MECHANISM
Original Filed Oct. 22, 1965  5 Sheets-Sheet 1

INVENTOR.
WILLIAM G. BROSENE, JR
BY
ATTORNEY

INVENTOR.
WILLIAM G. BROSENE, JR
BY
ATTORNEY

INVENTOR.
WILLIAM G. BROSENE, JR
BY
ATTORNEY

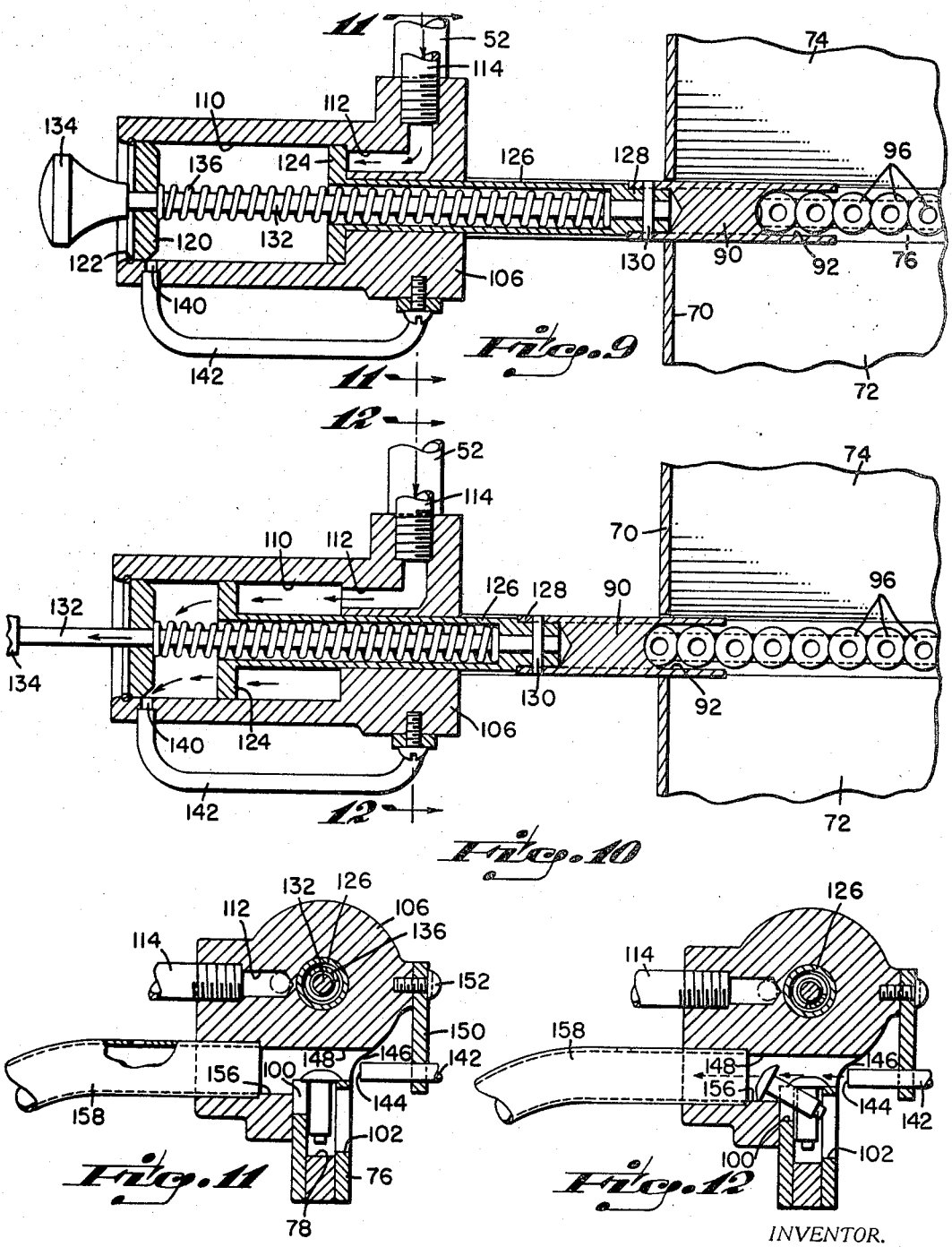

Aug. 13, 1968 W. G. BROSENE, JR 3,397,015
STUD FEEDING MECHANISM
Original Filed Oct. 22, 1965
5 Sheets-Sheet 5

INVENTOR.
WILLIAM G. BROSENE, JR
BY
ATTORNEY

United States Patent Office 3,397,015
Patented Aug. 13, 1968

3,397,015
STUD FEEDING MECHANISM
William G. Brosene, Jr., Wyoming, Ohio, assignor, by mesne assignments, to Studebaker Corporation, a corporation of Michigan
Original application Oct. 22, 1965, Ser. No. 500,899, now Patent No. 3,367,015. Divided and this application June 23, 1967, Ser. No. 663,906
8 Claims. (Cl. 302—2)

ABSTRACT OF THE DISCLOSURE

A mechanism for feeding studs having a shank portion and a head portion at one end from a hopper wherein the studs are disposed in random fashion in a predetermined end-to-end fashion. The hopper bottom is sloped and has an elongated slot to receive the shank portion of each stud. An agitator is provided for aligning studs in the elongated slot. Such agitator may comprise a reciprocating piston. The studs pass from the elongated slot into a guide and are ejected from the guide by a stream of pressurized gas.

---

This is a division of application Ser. No. 500,899 filed Oct. 22, 1965, now Patent No. 3,367,015 for Stud Feeding Mechanism.

The present invention relates to new and novel stud feeding mechanism, and more particularly to stud feeding mechanism adapted to be associated with a stud applicator gun and the like.

The stud feeding mechanism of the present invention may be utilized for example in feeding studs to a stud applicator gun which may be actuated by gas under pressure such as air for embedding studs within slits provided in the road engaging surface of a pneumatic tire. It will of course be understood that the stud feeding mechanism may be used for other applications if so desired.

The stud feeding mechanism of the present invention is especially adapted to provide a substantially continuous supply of studs from a suitable source to a stud applicator gun and the like.

In a first form of the invention, a hopper is provided within which a plrality of studs are disposed in random fashion. A principal feature of this form of the invention is the provision of suitable means for automatically aligning the studs within the hopper so that the studs may readily pass outwardly of the hopper into suitable guide means. Novel ejecting means is then provided for automatically feeding the aligned studs in the guide means into a suitable stud receiving portion with the studs passing head first into such stud receiving portion which in turn is connected with a suitable flexible conduit operatively associated with a stud applicator gun or the like. In this manner, the flexible conduit associated with the gun is adapted to be completely filled with studs disposed in end-to-end contacting relationship with the studs all being oriented in the same direction relative to the flexible conduit.

In a second form of the invention, elongated flexible conduits are provided which are originally completely filled with studs in end-to-end relationship as aforedescribed, one end of an elongated conduit being connected with the stud receiving portion of a stud applicator gun, and the other end of the elongated conduit being connected with the source of gas under pressure through the stud applicator gun for feeding studs thruogh the flexible conduit and into the stud receiving portion of the gun.

An object of the present invention is to provide new and novel stud feeding mechanism for providing a substantially continuous supply of studs to a stud applicator gun and the like.

Another object of the invention is the provision of stud feeding mechanism including a hopper means having a plurality of studs disposed in random fashion therewithin, and means for automatically aligning the studs for ready discharge from the hopper.

Still another object of the invention is to provide stud feeding mechanism including means for automatically feeding aligned studs into a suitable stud receiving portion which in turn is connected wth a flexible conduit and wheren the studs substantially fill the flexible conduit in end-to-end relationship therewithin and with all of the studs oriented in the same direction with respect to the conduit.

A still further object of the invention is the provision of stud feeding mechanism which is quite simple and inexpensive in construction, and yet which at the same time is efficient and reliable in use.

Other objects and many attendant advantages of the invention will become more apparent when considered in connection with the specification and accompanying drawings, wherein:

FIG. 4 is an enlarged view of a portion of the apparatus shown in FIG. 2;

FIG. 5 is an end view of the forward portion of the hopper with the reciprocating means removed therefrom and showing the guide means associated therewith;

FIG. 6 is a side view of the structure shown in FIG. 5;

FIG. 9 is a longitudinal section on an enlarged scale taken through the left-hand portion of the structure shown in FIG. 2;

FIG. 10 is a view similar to FIG. 9 illustrating the components in a different operative position;

FIG. 11 is a sectional view taken substantially along line 11—11 of FIG. 9 looking in the direction of the arrows;

FIG. 12 is a sectional view taken substantially along line 12—12 of FIG. 10 looking in the direction of the arrows;

Figure 1:
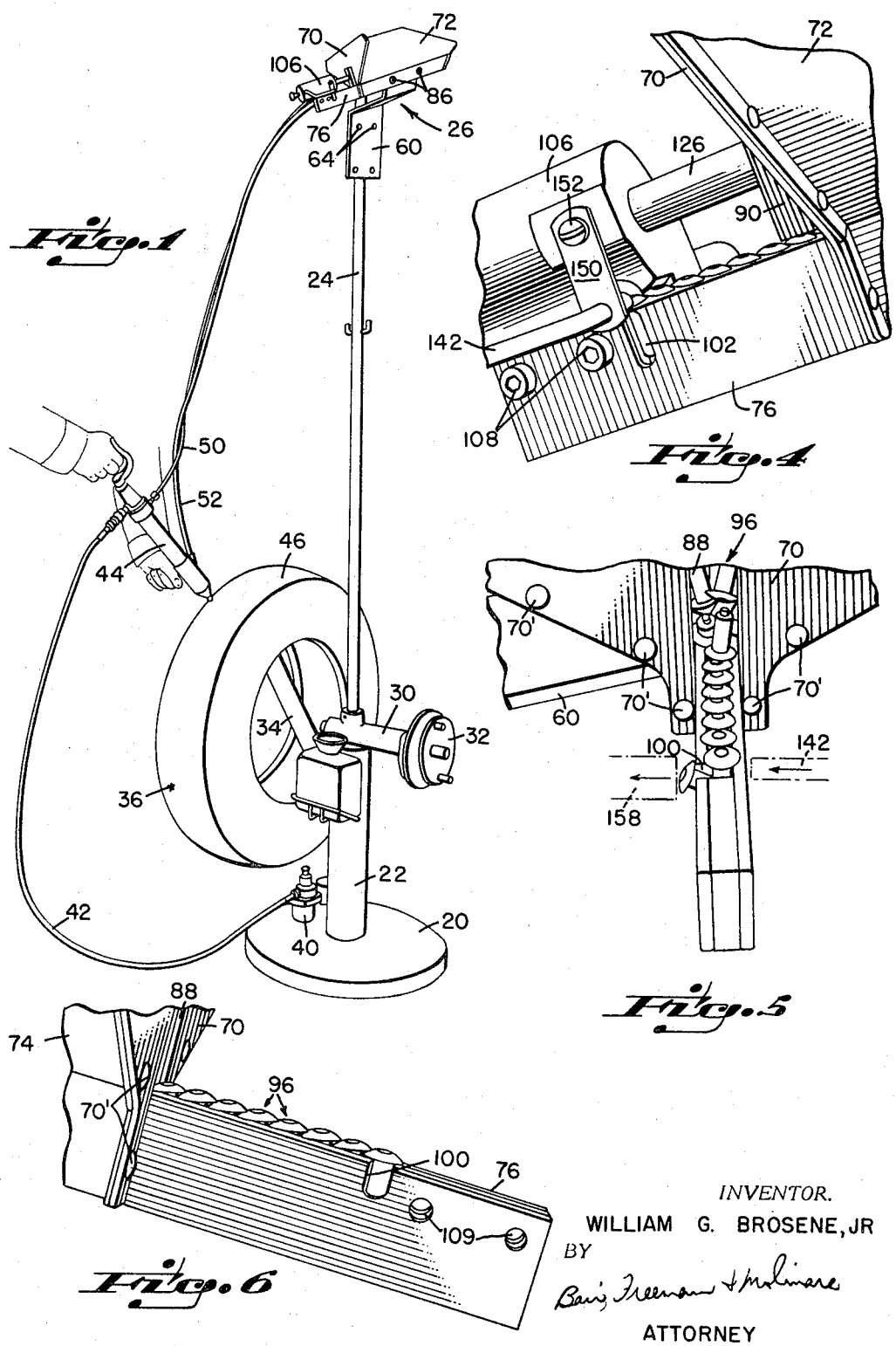
FIG. 1 is a top perspective view illustrating a first form of the apparatus in use.
Figure 2:
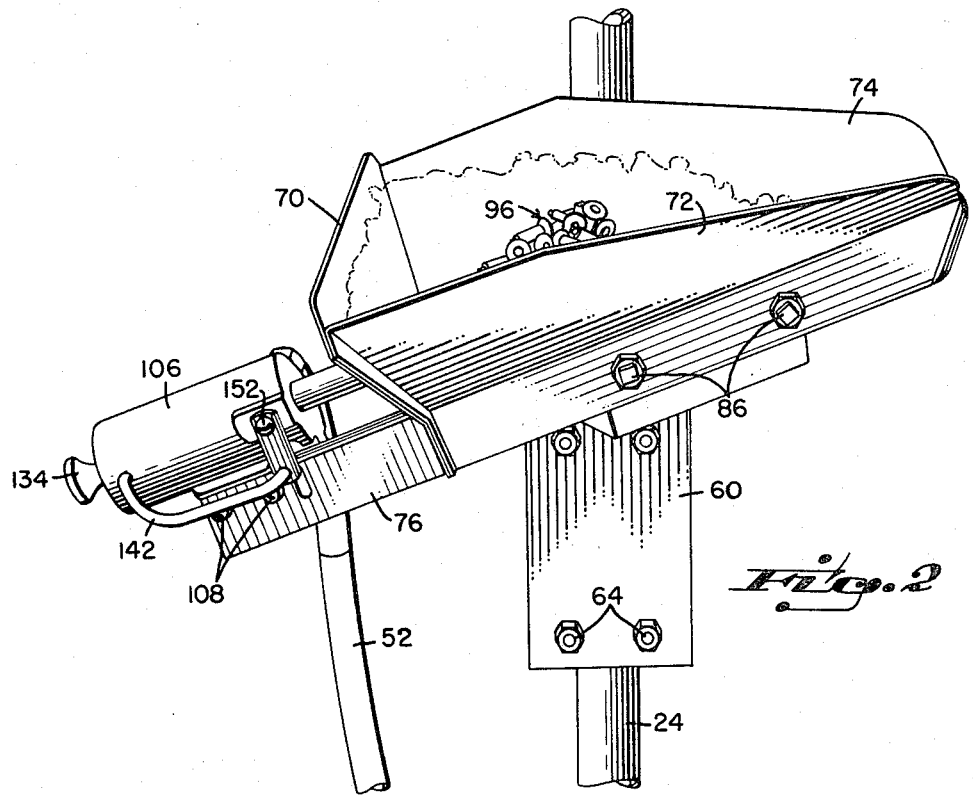
FIG. 2 is a top perspective view on an enlarged scale of the hopper means and the associated operating components as seen at the top of FIG. 1.
Figure 3:
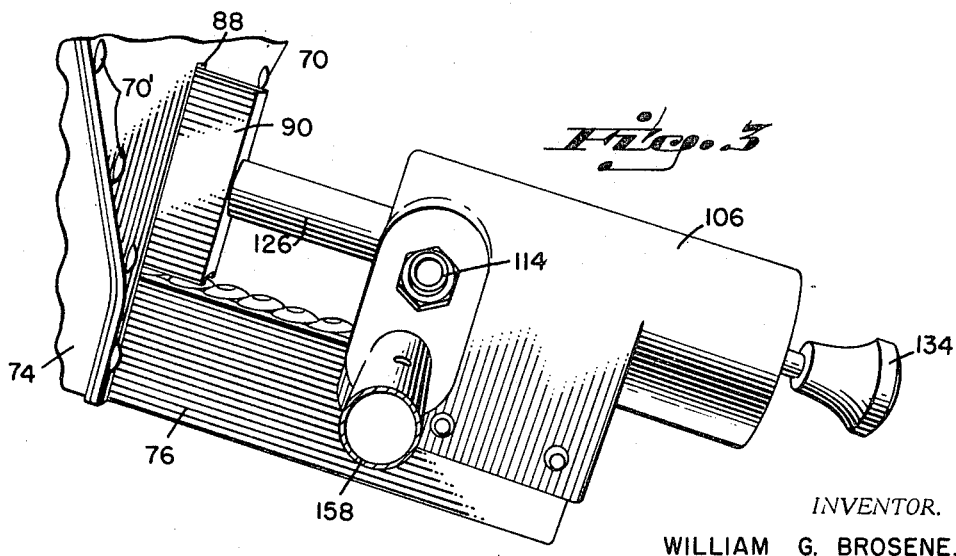
FIG. 3 is an enlarged view of the opposite side of the operating mechanism as seen in FIG. 2.
Figure 7:
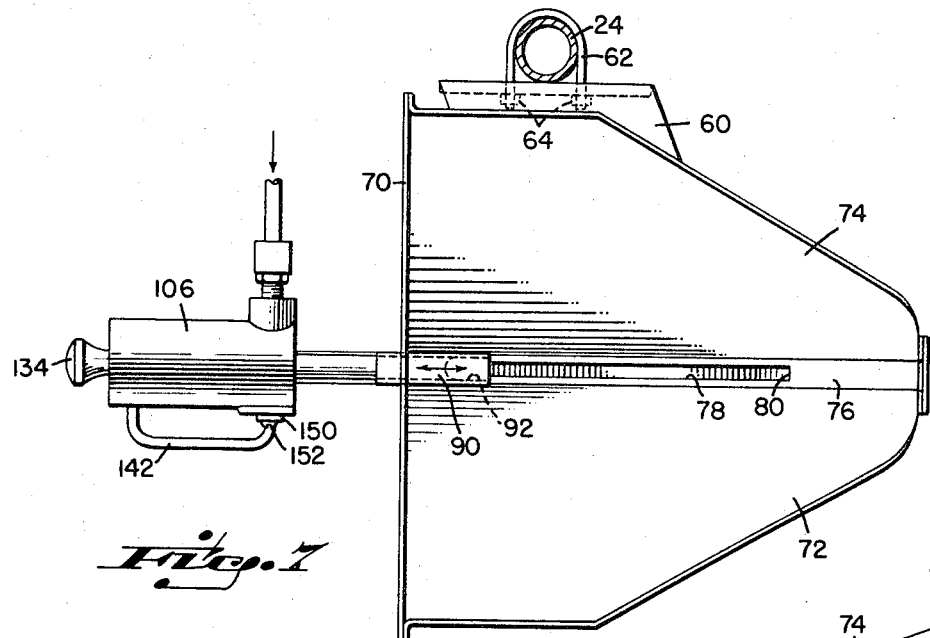
FIG. 7 is a top view of the apparatus shown in FIG. 2.

Referring now to the drawings wherein like reference characters designate corresponding parts throughout the several views, a first form of the invention is illustrated in FIGS. 1–12 inclusive. As seen in FIG. 1, a base member 20 is provided which is adapted to rest on a suitable support surface, and a vertically extending portion 22 projects upwardly therefrom. A further vertically extending portion 24 of reduced diameter extends upwardly from portion 22, and a hopper means along with associated operating components indicated generally by reference numeral 26 is supported at the upper end of portion 24. A laterally extending portion 30 is provided at the upper end of portion 22, and an automotive wheel 32 may be supported at the end of portion 30. A support member 34 extends upwardly at an oblique angle to portion 22 and is adapted to support a pneumatic tire 36.

A suitable source of gas under pressure is indicated by reference numeral 40, this source of gas under pressure being connected by means of a flexible conduit 42 with a conventional stud applicator gun 44. This stud applicator gun may be employed for embedding studs within slits provided in the road engaging surface 46 of the tire 36. The present invention is neither concerned with nor directed to the structural details of gun 44 nor the manner in which the studs are embedded in the tire.

A first flexible conduit 50 is operatively connected with the gun such that a surge of gas under pressure will be introduced into this conduit on the forward and return strokes of the piston disposed within the gun. These surges of gas under pressure are employed for operating certain components of the apparatus as hereinafter described.

A second flexible conduit 52 is adapted to be filled with studs in end-to-end relationship as described hereinbefore, conduit 52 being connected with the stud receiving portion of the gun 52 whereby the gun is adapted to be continuously operated.

Referring particularly to FIGS. 1–9 inclusive, a bracket member 60 is supported at the upper end of support portion 24 by a pair of U-bolts 62 which extend around the tubular support portion 24 with the opposite ends of the U-bolts extending through suitable openings provided in bracket member 60 and being secured in operative position by nut 64.

The hopper includes a forward portion or wall 70 and a bottom portion defined by a pair of wall members 72 and 74 which are so positioned as to converge downwardly toward one another, the forward edge portions of wall portions 72 and 74 having laterally extending flanges formed thereon which are secured to the forward portion 70 by rivets 70' or the like.

An elongated means 76 of generally rectangular cross sectional configuration is provided, elongated means 76 having an elongated slot 78 formed therein which terminates in an end wall 80 at one end of the slot, and an end wall 82 at the other end of the slot. Elongated means 76 is disposed between the lower facing portions of wall members 72 and 74 which are disposed substantially parallel with one another, and nut and bolt assemblies pass through aligned openings in members 72, 74 and 76 for securing the hopper and the associated operating components to the bracket member 60 whereby the entire assembly is supported in operative position at the upper portion of the support means previously described.

An outlet portion at the forward end of the hopper includes a substantially vertically extending slot 88. An agitating means includes a member 90 which is of generally rectangular cross sectional configuration and which has a sliding fit with slot 88 so that member 90 can be reciprocated back and forth through the slot and into the interior of the hopper. Member 90 has a generally vertically extending cutout portion 92 formed therein, and a further generally horizontally extending cutout portion 94 formed in the undersurface thereof.

Figure 8:
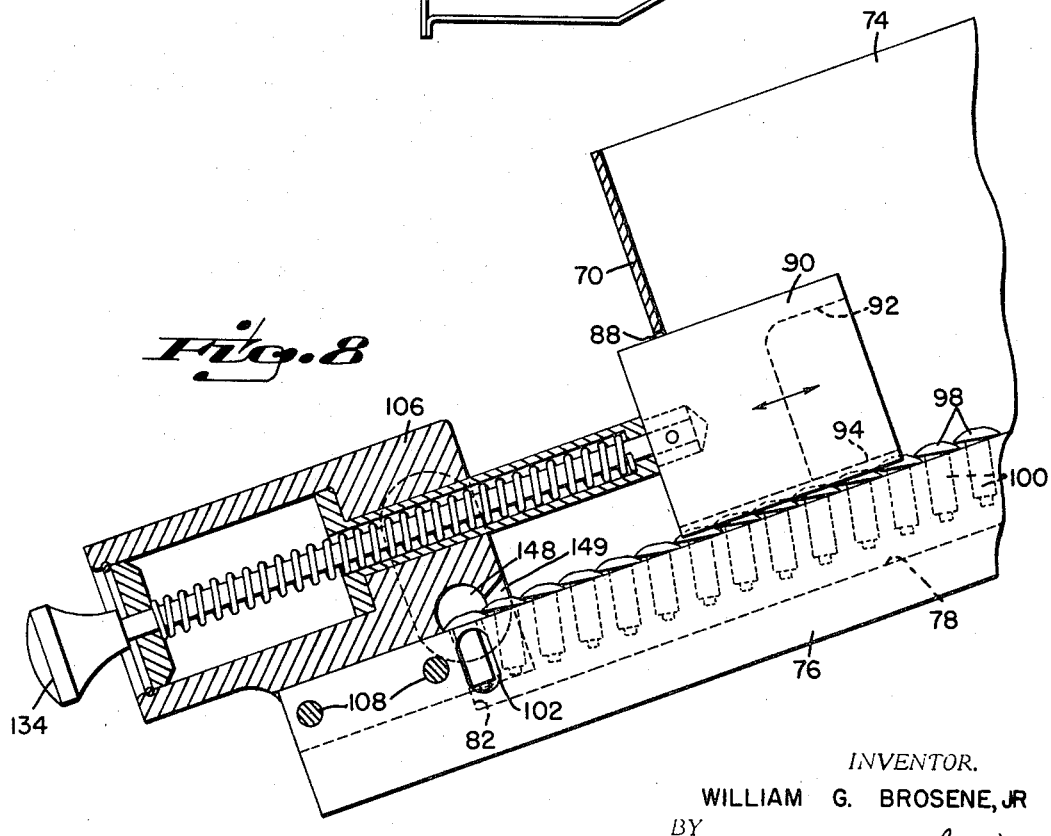
FIG. 8 is a enlarged view of a portion of the structure shown in FIG. 2 partly in section.

A plurality of studs indicated generally by reference numeral 96 are disposed in random fashion within the interior of the hopper, and as seen particularly in FIG. 8, each of these studs 96 includes an enlarged head portion 98 and a reduced shank portion 100. The slot 78 provided in enlongated means 76 is so dimensioned that the slot is adapted to readily receive the reduced shank portions 100, but the slot is not of such a dimension as to receive the enlarged head portions 98, whereby the studs will be suspended in the position shown in FIG. 8 within the slot 78 wherein the enlarged heads 98 are supported on the upper portion of elongated means 76, and the shank portions 100 hang downwardly within the slot 78.

As seen particularly in FIGS. 9 and 10, the cutout portion 92 provided in agitating member 90 is adapted to receive the enlarged head portion of the studs 96, the width of the cutout portion 92 being approximately 25% wider than the diameter of the head of an individual stud, and the cutout portion 92 extending longitudinally of member 90 a sufficient extent so as to receive the heads of approximately two studs therewithin. The longitudinally extending cutout portion 94 in the undersurface of agitating member 90 is of a width substantially the same as that of the cutout portion 92, cutout portion 94 providing clearance with the heads of the studs so that the studs can readily slide beneath the agitating member 90 under the influence of gravity into the position shown in FIG. 8.

It will be noted that the slot 78 formed in elongated means 76 forms a slot at the lower portion of the hopper, and further defines a guide means extending outwardly of the hopper so that the studs disposed within slot 78 can move downwardly to the interrelationship shown in 98 until the lowermost stud engages the end wall 82 of the slot which forms a stop portion. Immediately adjacent to this stop portion 82, elongated means 76 is provided with a first cutout portion 100 at one side thereof and a second cutout portion 102 at the opposite side thereof, cutout portion 100 being open at the top portion thereof, and cutout portion 102 being closed at the top portion thereof but being of greater depth than the cutout portion 100.

A housing 106 is supported on elongated means 76 by a pair of screws 108 which extend through suitable holes 109 provided in elongated means 76, the screws being threaded into correspondingly threaded holes provided in the housing. As seen in FIGS. 11 and 12, the housing 106 has a substantially cylindrical recess 110 formed therein, a passage 112 being in communication with cylindrical recess 110, and the passage in turn being in communication with the interior of a connector 114 which is suitably connected with the flexible conduit 50 previously described. This interconnection enables surges of air to pass from the gun to the operating mechanism for actuating the agitating means as more fully hereinafter described.

The open end of the cylindrical recess 100 is closed by a disc-like member 120 which may be suitably held in place as by a snap-ring 122 or the like. A piston 124 is slidably positioned within the cylindrical recess 110, the piston including an elongated tubular portion 126 which has a snug sliding fit within a correspondingly shaped hole in the housing 110. Portion 126 includes a reduced end portion 128 which is fitted within a recess provided in agitating member 90, and a cross pin 130 extends through portions 128 and 90 to secure them to one another.

An elongated rod 132 is positioned within the hollow interior of portion 126 and extends within a recess provided in the reduced portion 128, rod 132 having a hole formed therein which receives the cross pin 130, whereby rod 132 is also rigidly interconnected with members 128 and 90.

Rod 132 extends through the cylindrical recess 110 and thence through a central hole provided in member 120, and a manually graspable knob 134 is mounted on the outer end of rod 132 to permit manual manipulation of the agitating means. A compression spring 136 is disposed about rod 132 and normally urges the piston to the limit of its movement in the right-hand direction as seen in FIG. 9.

Referring again particularly to FIGS. 9 and 10, a hole 140 is provided in one side of housing 106 and is in communication with the left-hand end of the cylindrical recess 110 as seen in these figures. A conduit 142 has one end thereof in communication with hole 140, the opposite open end 144 of conduit 142 being disposed closely adjacent to the open end 146 of a passage 148 extending laterally through the housing 106. It is apparent as seen in FIGS. 11 and 12 that gas is adapted to be discharged from the open end of passage 144 in a direction to the left as seen in these figures and through the open end 146 of passage 148, and over the top of the lowermost stud disposed within the guide means and adjacent to the stop portion 82.

As seen particularly in FIG. 8, it will be noted that housing 106 is also provided with a cutout portion 149 adjacent the laterally extending passage 148. This cutout protion 149 provides clearance for the enlarged heads of the studs as they move downwardly within the guide means.

Referring again to FIGS. 11 and 12, the conduit 142 is supported adjacent the open end 144 thereof by a bracket member 150 having a hole formed therethrough through which the conduit 142 extends. Bracket 150 is in turn supported on housing 106 by means of a screw 152.

A portion 156 of the laterally extending passage 148 is adapted to receive the studs as they are ejected from the guide means by the gas stream passing over the heads of the studs from conduit 142. A conduit portion 158 is supported by the housing and is adapted to receive studs from the portion 156, the conduit portion 158 in turn being suitably interconnected with the flexible conduit portion 52 previously described.

In operation, the hopper will initially be loaded with a large number of studs in random fashion therewithin. In a typical example, several hundred studs may be disposed within the hopper. The hand grip portion 134 may be grasped to manually reciprocate the agitating member 90 whenever jamming should occur, which is extremely rare with the apparatus of the present invention, or in the event that it is desirable to initially align a plurality of studs as seen in FIG. 8 prior to initiation of a feeding operation.

It will be understood that reciprocation of the agitating member 90 within the hopper will cause the studs to fall into the slot 78 and to be posititioned as seen particularly in FIG. 8 of the drawings.

Upon actuation of the applicator gun 44, a surge of gas will be introduced into conduit 50 on the forward and return stroke of the piston of the applicator gun. This surge of air passes into the cylindrical recess 110 provided in housing 106 and urges piston 124 to the left into the position shown in FIG. 10. As the piston moves to the left, gas is forced outwardly of the left-hand portion of the cylindrical recess into conduit 142, whence it issues as a stream from the open end 144 of conduit 142. This operation is indicated in FIG. 12 wherein it will be observed that movement of the gas stream over the head of the lowermost stud will cause it to be tilted into the position shown in FIG. 12 as permitted by the cutout portions 100 and 102, and the stud will then be moved to the left into portion 158 and thence downwardly into the flexible conduit portion 52, so as to provide the studs in such flexible conduit portion on end-to-end relationship and all oriented in the same direction. Even a short blast of gas such as air from conduit 142 will be sufficient to advance three to ten studs in rapid machine-gun like rapidity into portion 158. In the event that portion 158 is filled with studs, any succeeding blast of gas from conduit 142 will merely be ineffective in ejecting other studs until the studs have been advanced sufficiently to permit additional room in the inlet portion of the conduit portion 158.

Figure 13:
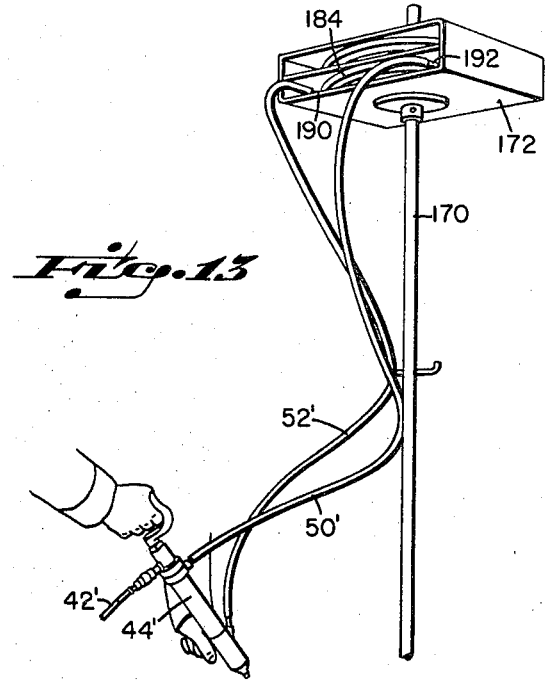
FIG. 13 is a perspective view of a modified form of the invention in use.
Figure 14:
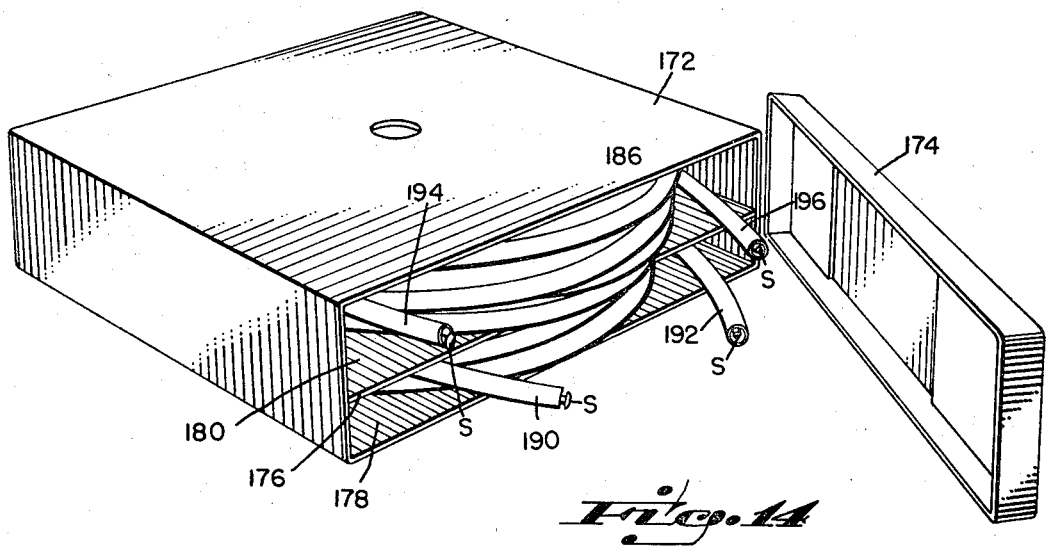
FIG. 14 is an enlarged top perspective view of the container means illustrated in FIG. 13.

Referring now to FIGS. 13 and 14 of the drawings, a modification of the present invention is illustrated wherein an upright support 170 is provided having a container 172 supported at the upper end thereof. Container 172 is provided with an intermediate partition 176 which divides the container into lower and upper compartments 178 and 180. A flexible conduit 184 is disposed in coiled relationship within the lower compartment 178, and a second flexible conduit 186 is disposed in coiled relationship within the upper compartment 180. The flexible conduit 184 has a first end portion 190 and a second end portion 192, the flexible conduit 184 being completely filled with studs indicated by reference character S, these studs being disposed within the conduit in end-to-end contacting relationship with the enlarged heads of the studs facing toward end portion 190 and the shank portions of the studs facing toward end portion 192. In a similar manner, flexible conduit 186 is provided with opposite end portions 194 and 196, this second flexible conduit also being completely filled with studs as indicated by reference numerals S, the studs being disposed in the same relationship within this conduit means as described in connection with flexible conduit 184.

A pair of flexible conduits 50' and 52' are interconnected with a stud applicator gun 44', it being noted that members 44', 50' and 52' may be substantially identical with the portions shown in FIG. 1 having the same reference numerals unprimed. A further conduit portion 42' corresponds with the conduit 42 of FIG. 1 for providing gas under pressure to the applicator gun. Conduit 50' as seen in FIG. 13 is interconnected with the end portion 192 of flexible conduit 184, while the flexible conduit 52' is connected with the end portion 190 of flexible conduit 184. It will be apparent that upon operation of the applicator gun, the studs will be fed from the flexible conduit 184 into the gun in the desired manner.

It will also be apparent that when the studs are exhausted from flexible conduit 184, the conduit portion 50' may be then interconnected with end portion 196 of the other conduit 186 in the container, and conduit portion 52' may be interconnected with the opposite end 194 of the conduit 186. The gun may then again be actuated until all of the studs are exhausted from conduit 186.

It will be apparent that the flexible conduits 184 and 186 may be re-filled with studs as required.

It is apparent from the foregoing that there is provided according to the present invention new and novel stud feeding mechanism for providing a substantially continuous supply of studs to a stud applicator gun and the like. Means is provided for automatically aligning a plurality of studs disposed in random fashion within a hopper means and further means is provided for automatically feeding aligned studs into a suitable conduit means with the studs disposed in end-to-end contacting relation and all oriented in the same direction. The apparatus is quite simple and inexpensive in construction, yet at the same time is quite efficient and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

With further reference to FIGS. 13 and 14 of the drawings it should be noted that I have illustrated what is in reality a prepackaged unit which constitutes stud storage and feeding means comprising an article of commerce per se which may be purchased by a user of the studs, then discarded when the studs have been used, and replace by another similar unit.

I claim:

1. Stud feeding mechanism comprising a hopper for receiving a plurality of studs disposed in random fashion therewithin, each of said studs having a shank portion and an enlarged head portion at one end of said shank portion, said hopper having an outlet portion through which studs are adapted to be discharged from the hopper, agitating means operatively associated with said hopper and movably mounted with respect thereto for aligning studs passing out of the hopper through said outlet portion, guide means adjacent said outlet portion for receiving aligned studs passing outwardly of the hopper, a stud receiving portion adjacent said guide means, and ejecting means adjacent said guide means for ejecting studs into said stud receiving portion with the enlarged head portion of the stud passing firstly into said stud receiving portion followed by the shank portion thereof, said ejecting means including means for directing a stream of gas under pressure over the upper portion of studs positioned within said guide means for moving the studs laterally away from said ejecting means.

2. Apparatus as defined in claim 1 wherein said hopper includes a bottom portion sloping downwardly toward a forward portion, said bottom portion of the hopper having an elongated slot formed therein wide enough to receive the shanks of the studs and smaller than the diameter of the heads of the studs, said slot being deeper than the shanks of the studs when the studs are suspended within said slot.

3. Apparatus as defined in claim 1 wherein said agitating means is mounted for reciprocation in said hopper, said hopper having a bottom portion, the agitating means having a clearance with said bottom portion to permit studs to pass beneath said agitating means, and operating mechanism for reciprocating said agitating means during operation of the apparatus.

4. Apparatus as defined in claim 1 wherein said guide means includes a slot extending longitudinally thereof, a stop portion for limiting movement of studs within said guide means, said guide means including cutout portions adjacent said stop portion for permitting tilting movement of the studs when being ejected from the guide means.

5. Apparatus as defined in claim 1 wherein said means for operating the agitating means includes a piston member operatively connected with said agitating means, a cylinder within which said piston member is adapted to reciprocate, means for introducing gas under pressure to one end of the cylinder, means connected with the opposite end of the cylinder for directing gas from said opposite end of the cylinder, said last-mentioned means being operatively connected with said ejecting means.

6. Apparatus as defined in claim 1 wherein said means for operating the agitating means comprises a piston operatively connected with said agitating means, said piston being slidably mounted within a cylinder, a source of gas under pressure operatively connected with said cylinder for operating said piston therewithin, resilient means operatively connected with said piston and normally biasing said piston in one direction within said cylinder, and manually operable means connected with said piston for manually operating the piston when desired.

7. Stud feeding mechanism comprising a hopper for receiving a plurality of studs disposed in random fashion therewithin, each of said studs having a shank portion and an enlarged head portion at one end of said shank portion, said hopper having an outlet portion to which studs are adapted to be discharged from the hopper, agitating means operatively associated with said hopper and movably mounted with respect thereto for aligning studs passing out of the hopper through said outlet portion, guide means adjacent said outlet portion for receiving aligned studs passing outwardly of the hopper, a stud receiving portion adjacent said guide means, and ejecting means adjacent said guide means for ejecting studs into said stud receiving portion with the enlarged head portion of the stud passing firstly into said stud receiving portion followed by the shank portion thereof, said hopper including a bottom portion sloping downwardly toward a first portion, said bottom portion having a slot formed therein for receiving the shanks of studs, said agitating means being reciprocably mounted within said hopper in overlying relationship to a portion of said slot, said agitating means having a clearance with the bottom of the hopper to permit studs to move beneath the agitating means, means for reciprocating said agitating means during operation of the apparatus, said hopper having an outlet portion in communication with said slot in the hopper, guide means having a slot form therein adjacent said outlet portion and in alignment with the slot in the hopper for receiving aligned studs from the outlet portion of the hopper, said guide means including a stop portion for limiting movement of studs therein, a stud receiving portion adjacent said guide means for receiving studs therefrom, and ejecting means adjacent said guide means and generally aligned with said stud receiving portion, said ejecting means being adapted to direct a stream of gas under pressure over the upper portion of said studs supported in the guide means for moving said studs headfirst into said stud receiving portion.

8. Apparatus as defined in claim 7 wherein said means for operating the reciprocating means includes a piston operatively connected with said reciprocating means, a cylinder, said piston being slidably supported within said cylinder, a source of gas under pressure operatively connected with one end of said cylinder for operating the piston within said cylinder, resilient means biasing said piston in one direction within said cylinder, and means connected with the opposite end of said cylinder and operatively connected with said ejecting means for providing gas under pressure to said ejecting means upon movement of said piston within said cylinder.

References Cited

UNITED STATES PATENTS

| | | | |
|---|---|---|---|
| 1,137,316 | 4/1915 | Herr | 221—163 |
| 2,366,448 | 1/1945 | Greene et al. | 302—2 |
| 2,431,831 | 12/1947 | Sabaitis | 221—163 |
| 2,534,140 | 12/1950 | Moore | 302—2 |
| 2,803,274 | 8/1957 | Zubal et al. | 221—165 |
| 3,057,514 | 10/1962 | Dixon | 221—179 |
| 3,301,284 | 1/1967 | Clapp | 302—2 |

ANDRES H. NIELSEN, *Primary Examiner.*